United States Patent [19]
Raje et al.

[11] Patent Number: 5,881,260
[45] Date of Patent: Mar. 9, 1999

[54] METHOD AND APPARATUS FOR SEQUENCING AND DECODING VARIABLE LENGTH INSTRUCTIONS WITH AN INSTRUCTION BOUNDARY MARKER WITHIN EACH INSTRUCTION

[75] Inventors: Prasad A. Raje, Fremont; Stuart C. Siu, Newark, both of Calif.

[73] Assignee: Hewlett-Packard Company, Palo Alto, Calif.

[21] Appl. No.: 20,474

[22] Filed: Feb. 9, 1998

[51] Int. Cl.$^6$ ............................... G06F 9/38; G06F 9/00; G06F 9/30
[52] U.S. Cl. ..................... 395/386; 395/380; 395/391; 395/383; 395/384; 395/584; 395/800.24; 711/213; 711/215
[58] Field of Search ..................... 395/386, 391, 395/383, 380, 384, 584, 800.24; 711/213, 215

[56] References Cited

U.S. PATENT DOCUMENTS

| | | | |
|---|---|---|---|
| 4,236,206 | 11/1980 | Strecker et al. | 395/383 |
| 4,450,605 | 5/1984 | Grochowski et al. | 395/380 |
| 4,502,111 | 2/1985 | Riffe et al. | 395/384 |
| 5,179,680 | 1/1993 | Colwell et al. | 395/391 |
| 5,283,873 | 2/1994 | Steely, Jr. et al. | 395/386 |
| 5,327,536 | 7/1994 | Suzuki | 395/383 |
| 5,381,532 | 1/1995 | Suzuki | 395/380 |
| 5,386,521 | 1/1995 | Saitoh | 395/386 |
| 5,438,668 | 8/1995 | Coon et al. | 395/380 |
| 5,459,847 | 10/1995 | Okamura | 395/383 |
| 5,504,923 | 4/1996 | Ando | 395/383 |
| 5,513,330 | 4/1996 | Stiles | 395/386 |
| 5,535,347 | 7/1996 | Grochowski et al. | 395/383 |
| 5,579,493 | 11/1996 | Kiuchi et al. | 395/391 |
| 5,581,774 | 12/1996 | Yoshitake et al. | 395/386 |
| 5,586,276 | 12/1996 | Grochowski et al. | 395/380 |
| 5,598,544 | 1/1997 | Ohshima | 395/380 |
| 5,615,386 | 3/1997 | Amerson et al. | 395/5 |

(List continued on next page.)

OTHER PUBLICATIONS

Thomas M. Conte, Sanjeev Banderjia, Sergei Y. Larin, Kishore N. Menezes, and Sumedh W. Sathaye "Instruction Fetch Mechanims for VLIW Architectures with Compressed Encodings." In Proc. 29th Ann. Int'l Symp. on Microarchitecture, pp. 1–11, Paris, France, Dec. 1996.

Sanjeev Banerjia, Kishore N. Menezes and Thomas M. Conte "NextPC computation for a banked instruction canche for a VLIW architecture with a compressed encoding." sbanerj,knmeneze,conte@eos.ncsu.edu, pp. 1–10.

Primary Examiner—Parshotam S. Lall
Assistant Examiner—Willaim D. Thomson

[57] ABSTRACT

An apparatus and method are shown for decoding variable length instructions in a processor where a line of variable length instructions from an instruction cache are loaded into an instruction buffer and the start bits indicating the instruction boundaries of the instructions in the line of variable length instructions is loaded into a start bit buffer. A first shift register is loaded with the start bits and shifted in response to a lower program count value which is also used to shift the instruction buffer. A length of a current instruction is obtained by detecting the position of the next instruction boundary in the start bits in the first register. The length of the current instruction is added to the current value of the lower program count value in order to obtain a next sequential value for the lower program count which is loaded into a lower program count register. An upper program count value is determined by loading a second shift register with the start bits, shifting the start bits in response to the lower program count value and detecting when only one instruction remains in the instruction buffer. When one instruction remains, the upper program count value is incremented and loaded into an upper program count register for output to the instruction cache in order to cause a fetch of another line of instructions and a '0' value is loaded into the lower program count register. Another embodiment of the present invention includes multiplexors for loading a branch address into the upper and lower program count registers in response to a branch control signal.

20 Claims, 5 Drawing Sheets

U.S. PATENT DOCUMENTS

| | | | |
|---|---|---|---|
| 5,623,615 | 4/1997 | Salem et al. | 395/383 |
| 5,624,787 | 4/1997 | Mahin et al. | 395/383 |
| 5,664,135 | 9/1997 | Schlansker et al. | 395/383 |
| 5,680,564 | 10/1997 | Divivier et al. | 395/383 |
| 5,680,637 | 10/1997 | Hotta et al. | 395/800.24 |
| 5,689,972 | 11/1997 | Witt et al. | 395/383 |
| 5,721,854 | 2/1998 | Ebcioglu et al. | 395/391 |
| 5,751,981 | 5/1998 | Witt et al. | 395/391 |

METHOD AND APPARATUS FOR SEQUENCING AND DECODING VARIABLE LENGTH INSTRUCTIONS WITH AN INSTRUCTION BOUNDARY MARKER WITHIN EACH INSTRUCTION

CROSS-REFERENCE TO RELATED APPLICATIONS

This patent application is related to a commonly-assigned patent application entitled "METHOD AND APPARATUS FOR STORING AND EXPANDING COMPRESSED PROGRAMS FOR WIDE INSTRUCTION WORD ARCHITECTURES", Ser. No. 08/767,450, filed Dec. 16, 1996; and commonly-assigned patent application by Prasad Raje and Paolo Faraboschi entitled "METHOD AND APPARATUS FOR ENCODING, DECODING AND DISPERSING INSTRUCTIONS IN A MULTIPLE FUNCTIONAL UNIT MICROPROCESSOR", Ser. No. 08/871,128, filed Jun. 9, 1997, the disclosures of which are incorporated herein by reference.

FIELD OF THE INVENTION

The present invention relates to computers which utilize variable length instructions and, more particularly, to a method and apparatus for sequencing through variable length instructions in an instruction cache.

BACKGROUND OF THE INVENTION

VLIW (Very Long Instruction Word) machines use horizontally encoded wide instructions that issue an operation code to each of the functional units of the VLIW machine every machine clock cycle. The compiler that generates the machine level code for the VLIW machine sometimes cannot find enough instruction level parallelism (ILP) to keep all the functional units busy during a given clock cycle, therefore no-operation codes (NOPs) have to be issued to some functional units.

There are two classes of VLIW encodings to handle NOP's: uncompressed and compressed instructions. Uncompressed instructions explicitly encode the NOP's in the instruction word. Therefore the code density, the density of effective operational codes versus NOPs, can be sparse if the compiler compiling a program cannot identify a high level of ILP in the program. The instruction fetch mechanism for uncompressed instructions is simple because the instruction word length is a constant and the sequencing for the next program count address $PC_{i+1}$ is just the present program count address $PC_i$ plus the constant word length, i.e. $PC_{i+1}=PC_i+\text{constant}$.

The present invention addresses the more complex case presented by compressed instructions wherein the main memory contains compressed instructions and the instruction fetch mechanism must cope with compressed VLIW instructions which have variable length.

Compressed instructions do not explicitly encode all the NOP's in the instructions, in order to reduce the space used in the memory system for instruction storage. However, because the number of NOPs removed from an instruction varies, compressed instructions have a variable-length instruction format. Variable-length instructions have always posed problems for sequencing of the program counter because of the uncertainty of the length of the current instruction being fetched. In addition, compressed instructions need to be decompressed or expanded before the instruction can be executed in the functional units of the microprocessor.

In conventional variable length computers, such as the IBM 360 or Digital's VAX, the current instruction length is not known until the instruction is decoded. In the design of fast computers, the technique of pipe-lining is commonly used where instruction processing is broken up into pipe-stages such as fetch, decode, execution, and writeback. The fastest clock cycle, or operating frequency, at which the computer can run is limited by the latency of the slowest stage of the pipeline. The problem with variable-length instructions is that the fetch and decode of an instruction needs to be combined into a single pipe-stage since the program counter cannot point to the next instruction unless it knows the length of the current instruction. As a consequence, the maximum frequency of the microprocessor is reduced because the instruction fetch tends to be one of the critical paths.

Other conventional microprocessors, such as Philips' Trimedia, explicitly encode information describing the instruction in the instruction format. Trimedia actually encodes the length of the next instruction, instruction$_{i+1}$, into the current instruction, instruction$_i$. Therefore, the length of the current instruction being fetched is known because it was decoded from the previous instruction. The major problem with this solution is that encoding the length of the each instruction takes up bit space in the instruction formats and branch targets are required to be a defined length instruction since the nature of the previous instruction is unknown.

Another VLIW system, the TINKER, is described in Conte, T. et. al., "Instruction Fetch Mechanisms for VLIW Architectures with Compressed Encodings", IEEE: Proceedings of the 29th Annual Symposium on Microarchitecture, Dec. 2–4, 1996; and in Banerjia, Sanjeev. et. al., "NextPC computation for a banked instruction cache for a VLIW architecture with a compressed encoding", Department of Electrical and Computer Engineering, North Carolina State University. NextPC refers generally to the function for obtaining the program count of the next instruction to be executed. The TINKER architecture attempts to solve the variable-length problem by incorporating logic during the instruction cache (ICACHE) refill to calculate the lengths of the instructions and place the calculated value in a length field in the ICACHE. Therefore, the sequencing is simply $PC_{i+1}=PC_i+\text{length}_i$, which is done prior to refill.

However, the penalty for this solution is that a larger ICACHE or a separate memory array is required to hold the length$_i$ information of all the instructions in the ICACHE. The size of the array depends on the maximum number of instructions that are possible for a single ICACHE line (instruction$_{max}$) the number of bits required to encode the maximum length of one instruction (encode_bits), and the number of cache lines in the ICACHE (rows). Therefore, the length field array dimensions will be: rows X instruction$_{max}$X encode_bits (lines X bits). As an example, the HP Lisard processor, which has an ICACHE of 256 lines, a line size of 32 words (32 instructions max), and a maximum instruction length of 12 words (4 encoding bits) would need an array of 256×128, which represents a 12.5% increase in the size of the ICACHE to accommodate encoding overhead.

Accordingly, a need remains for a way to sequence through variable length instructions without experiencing delays in instruction decoding to fetch additional lines of instructions from the instruction cache when a sequence of instructions crosses an instruction cache line boundary and without requiring additional storage capacity to store the length of each variable length instruction along with the instruction.

SUMMARY OF THE INVENTION

One object of the present invention is to provide an apparatus and method for efficient sequencing through variable length instructions by detecting the instruction boundary marker of the next adjacent instruction in a line of compressed instructions in an instruction buffer to determine the length of a current instruction in the line of compressed instructions in the instruction buffer.

Another object of the present invention is to detect when only one unexecuted instruction remains in the line of compressed instructions in the instruction buffer and fetch another line of compressed instructions from an instruction cache.

Yet another object of the present invention is to accommodate branches in the sequence of variable length instructions by loading a branch address responsive to a branch control signal.

One embodiment of the present invention includes an instruction decoding circuit for decoding variable length instructions having instruction boundary markers. The instruction decoding circuit comprises an instruction buffer configured to receive and store a line of variable length instructions from an instruction cache. The instruction decoding circuit includes an instruction sequencing circuit configured to receive the instruction boundary markers corresponding to the line of variable length instructions and generate an instruction cache line address signal and an instruction buffer control signal. The instruction buffer control signal is configured to select the selected variable length instruction from the instruction buffer responsive to the instruction boundary markers such that each variable length instruction can be selected for output. The instruction cache line address signal is configured to select the line of variable length instructions from the instruction cache. The instruction sequencing circuit is configured to detect an end of instruction cache line condition and, responsive thereto, to increment the instruction cache line address signal in order to fetch another line of variable length instructions from the instruction cache.

An embodiment of the method, according to the present invention, for sequencing variable length instructions in a processor includes the steps of marking a boundary between variable length instructions with an instruction boundary marker in each instruction, loading a line of variable length instructions from an instruction cache into an instruction buffer, detecting a position of an instruction boundary marker corresponding to an adjacent instruction in the line of variable length instructions in the shift register, encoding the position of the instruction boundary marker of the adjacent instruction into a length value, and shifting the line of variable length instructions by the length value.

Another embodiment of the present invention includes a variable length instruction decode circuit for decoding variable length instructions. The circuit includes an instruction buffer which receives a line of variable length instructions from an instruction cache and shifts the line of variable length instructions toward a most significant word position of the instruction buffer responsive to an instruction buffer control signal. The circuit also includes a first shift register configured to receive a set of boundary marker bits corresponding to the line of variable length instructions in the instruction buffer and to shift the set of bits toward the most significant bit position of the first shift register responsive to the instruction buffer control signal. The first shift register has a shift input which is configured to fill the first shift register with a boundary marker bit value corresponding to an instruction boundary marker responsive to each shift. A first instruction boundary marker detector is also included which is configured to receive the boundary marker bits contained within the first shift register and output a length value corresponding to a number of bit positions between the most significant bit position and the next most significant bit position indicating an instruction boundary marker in the set of boundary marker bits. The length value generated by the first instruction boundary marker detector is used by an instruction buffer control signal generator configured to output the instruction buffer control signal. The value of the instruction buffer control signal is determined by adding the length value to a current value of the instruction buffer control signal in order to produce a next value of the instruction buffer control signal.

The foregoing and other objects, features and advantages of the present invention will become more readily apparent from the following detailed description of a preferred embodiment of the invention which proceeds with reference to the accompanying drawings.

DETAILED DESCRIPTION

General Hardware and Instruction Arrangement

The present invention is directed toward a NEXTPC method and apparatus for sequencing through variable length instructions which does not add logic to the fetch stage circuitry, does not require additional storage area in the ICACHE for an instruction length field, avoids the introduction of delays (bubbles) into the instruction pipeline, i.e. the sequencing of instructions is not interrupted when crossing ICACHE line boundaries, and reduces power dissipation by reducing the number of ICACHE accesses. The instruction format requires an instruction boundary marker in the instruction format that delineates between different instructions. Previous machines such as the Digital VAX and IBM 370 did not have such boundary markers. The instruction boundary marker is the subject of commonly assigned patent application Ser. No. 08/767,450, filed Dec. 16, 1996, herein incorporated by reference.

Figure 1:
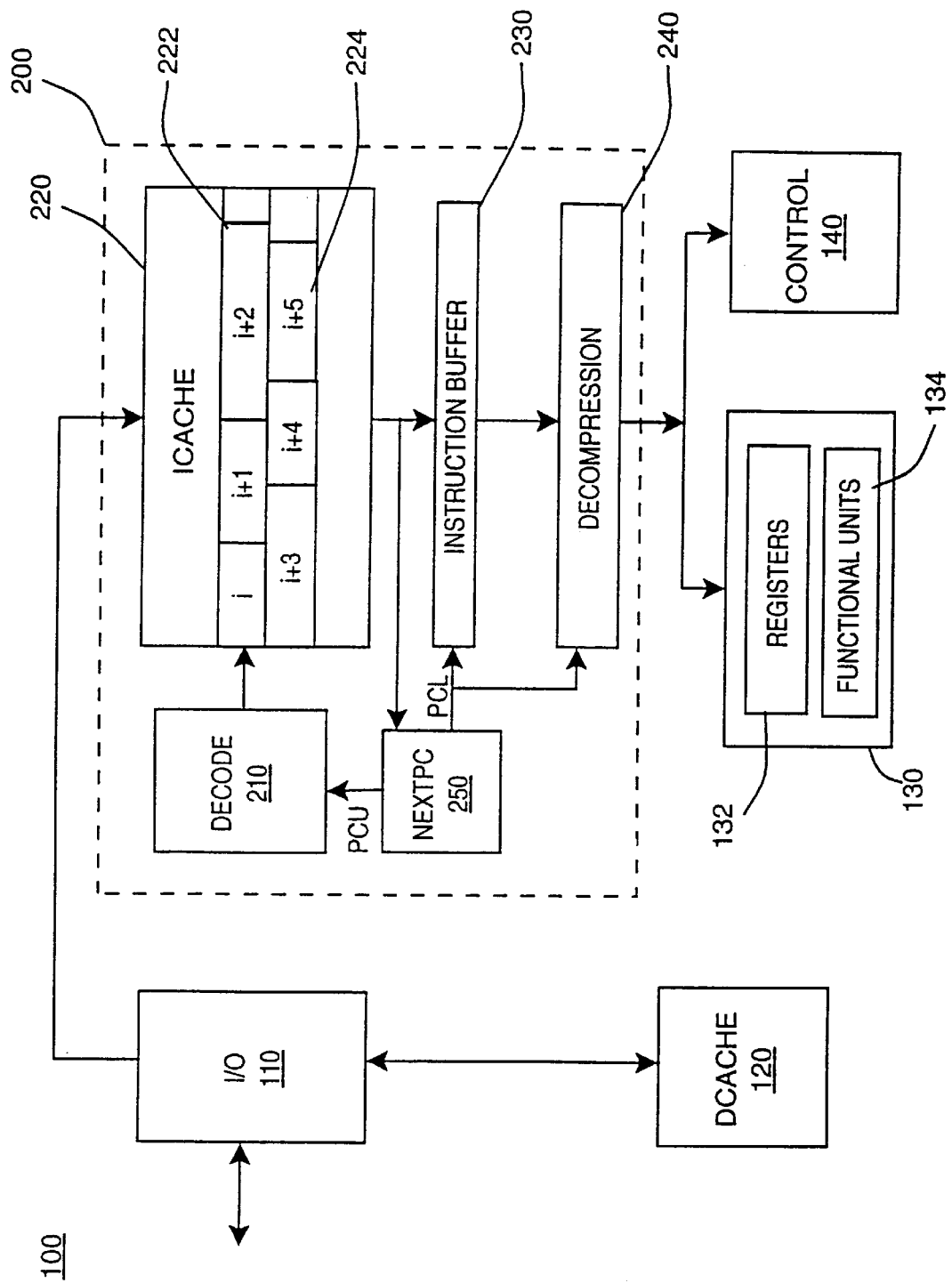
FIG. 1 is a functional block diagram of an embodiment of a microprocessor having an instruction decode according to the present invention.

FIG. 1 shows an example of a microprocessor 100 having an ICACHE 220 wherein data in (or "contents of") first ICACHE line 222 and second ICACHE line 224 have been loaded into ICACHE 220 from instruction storage (not shown) external to microprocessor 100 through I/O port 110. ICACHE 220 holds one or more instructions per cache line and is accessed once in order to load an entire ICACHE line into instruction buffer 230. Loading the entire cache line in a single access saves power, but the main benefit is that the entire ICACHE line is available for the NEXTPC logic 250 to look ahead to determine the length of instructions within the ICACHE line and to detect when the end of the ICACHE line has been reached. A main assumption is that an instruction does not cross ICACHE line boundaries, i.e. each instruction resides wholly within a single ICACHE line.

To demonstrate the function of instruction decode circuitry 200, assume that ICACHE line 222 shown in FIG. 1 is loaded into the INSTRUCTION BUFFER 230 during a fetch stage. After the fetch, the current instruction is sent to the DECOMPRESSION logic 240 to expand the instruction into a full VLIW instruction containing an operational code for each operational unit within microprocessor 100, such as registers 132, functional units 134 and control 140.

Figure 2:
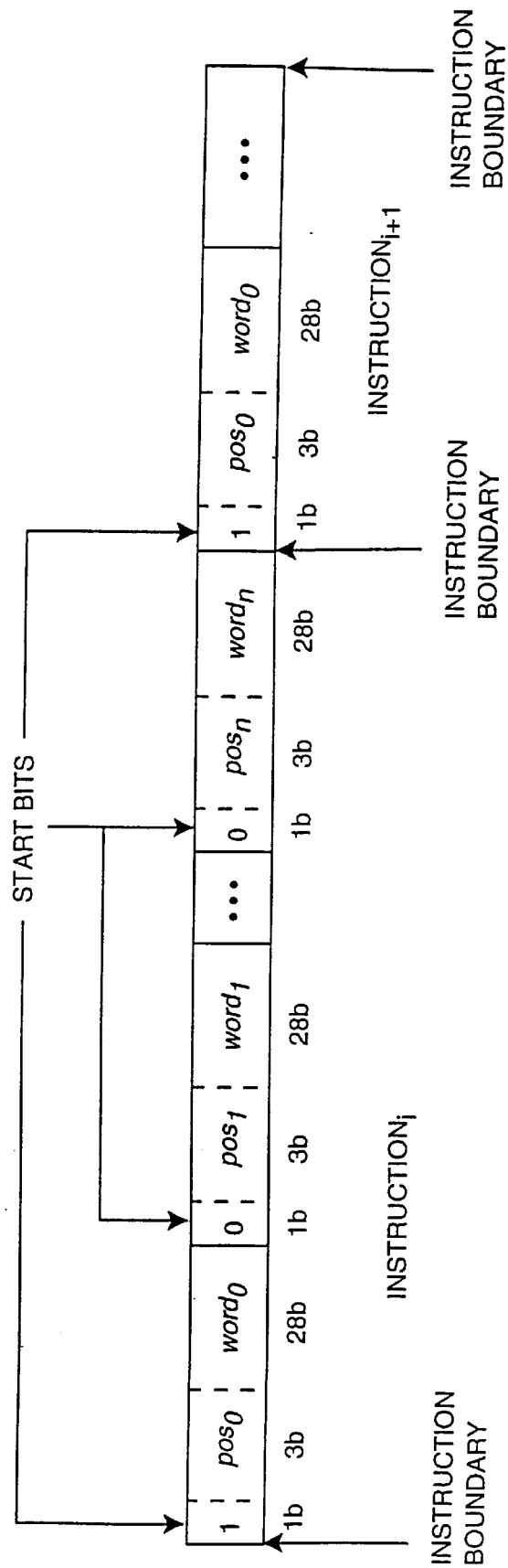
FIG. 2 is a diagram of an example of variable length instructions decoded by the instruction decode circuitry of the present invention illustrating the use of start bits as instruction boundary markers.

At the same time, the NEXTPC logic 250 scans INSTRUCTION BUFFER 230 for an instruction boundary marker of the next instruction. The instruction format example illustrated in FIG. 2 uses start bits as the instruction boundary marker. A bit in each word of the instruction format is designated as the start bit. When the start bit="1", this designates the start of a new instruction. If the start bit="0", this indicates that this word is a continuation of the current instruction. The first bit of each instruction word is the start bit; the $pos_n$ field indicates to the DECOMPRESSION logic 240 which functional unit or units to which the information in $word_n$ is routed. The $word_n$ field contains the opcode, operand information or immediate data for the functional unit. Thus, in the example illustrated in FIG. 2, the start bit of $word_o$ of each of $INSTRUCTION_i$ and $INSTRUCTION_{i+1}$ is set to "1" to indicate the start of an instruction and the start bits of the other words are set to "0".

The start bit can be a "0" as well, with the start bits of continuing words of the current instruction being "1". In general, any multibit pattern could also be used as the start bits provided that this pattern is distinguishable from the values in the same bit positions in words that are continuations of the current instruction.

Once the instruction boundary marker of the next instruction in the ICACHE line is found, the length of the current instruction $length_i$ can be calculated so that the position of the next instruction is known for the next instruction cycle. For example, if the smallest unit, or word, in an ICACHE line is 32 bits or one word, once the location of the boundary marker of the next instruction in the ICACHE line is found, then the length of the current instruction $length_i$ is known. Since the current instruction $PC_i$ is now known, the start of the next instruction $PC_{i+1}$ is obtained from $PC_{i+1}=PC_i+length_i$.

Logical Operation of Program Counter

Figure 3:
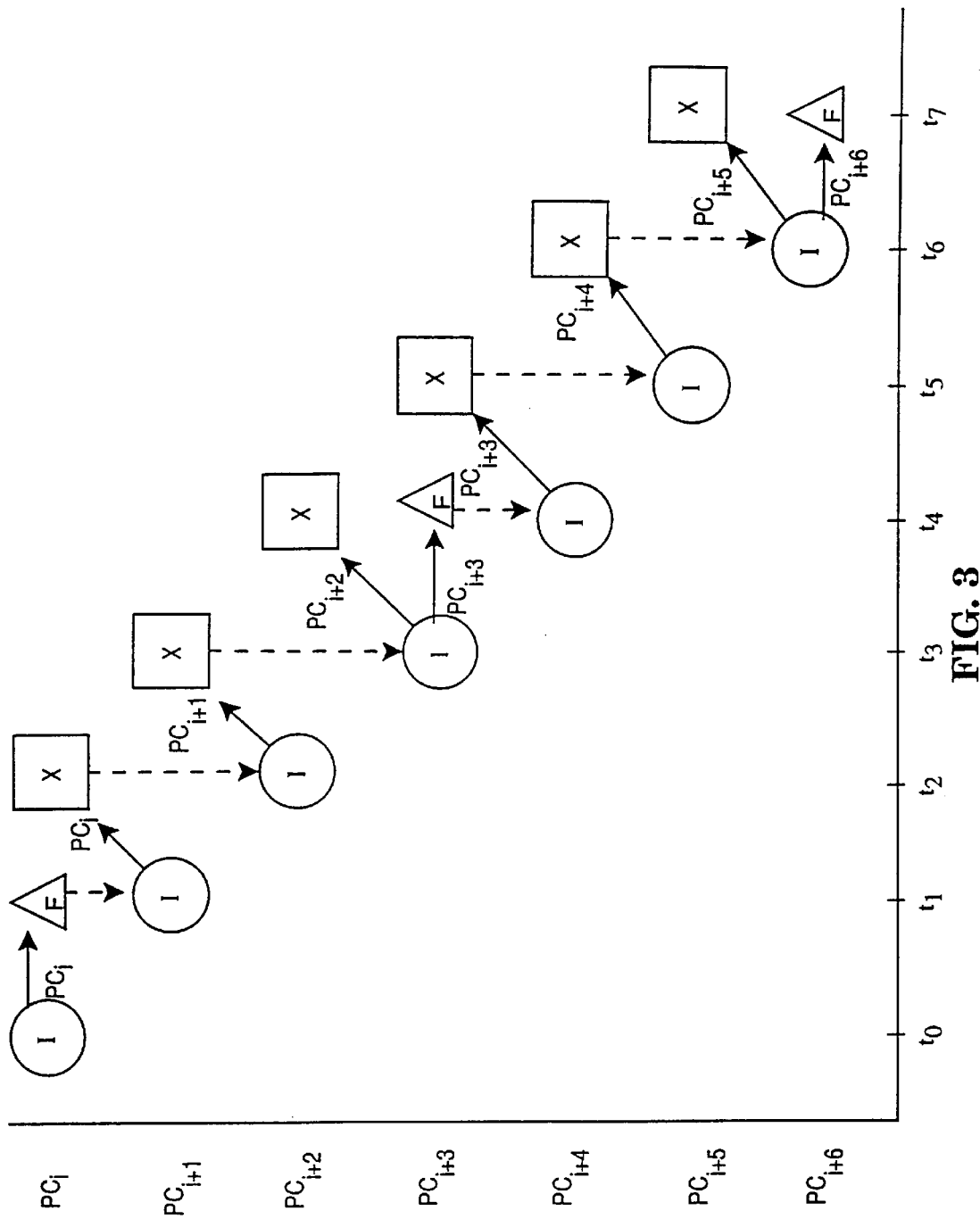
FIG. 3 is a diagram illustrating an example of the timing of the instruction decode according to the present invention in the microprocessor of FIG. 1.

FIG. 3 illustrates the operation of the NEXTPC logic 250 in calculating the program counter values in parallel with decompression of instructions and fetching of additional ICACHE lines when the instruction sequence crosses an ICACHE line boundary. At time $t_0$, NEXTPC logic 250 calculates (the calculation operation being represented by the circle marked I) the program counter value $PC_i$ of $INSTRUCTION_i$ which is at the beginning of a new ICACHE line 222. ICACHE line 222 is then fetched at time $t_1$, the fetch operation being represented by the F in a triangle symbol in FIG. 3, from ICACHE 220 and loaded into INSTRUCTION BUFFER 230.

$INSTRUCTION_i$ is decompressed at time $t_2$ by DECOMPRESSION logic 240 while NEXTPC logic 250 calculates the program counter value $PC_{i+1}$ of the next instruction $INSTRUCTION_{i+1}$ so that the decompression of $INSTRUCTION_{i+1}$ can begin in the next instruction cycle at time $t_3$. The dotted lines in FIG. 3 indicate that the decompression stage (indicated by the boxes marked X) feeds the length information for the instruction being decompressed to the NEXTPC computation during the I-stage.

At $t_3$, the NEXTPC logic 250 detects the end of ICACHE line 222 and outputs $PC_{i+3}$ in order to perform a fetch of the next ICACHE line 224 at time $t_4$ while $INSTRUCTION_{i+2}$ is being decompressed. The NEXTPC method of the present invention differs from conventional NEXTPC approaches in that the calculation for the next program counter value is done every cycle while decompression of the current instruction is taking place, i.e. the NEXTPC calculation occurs "on-the-fly" without delays in the instruction cycle.

As discussed above, since an entire ICACHE line, such as ICACHE lines 222 and 224, is stored in the INSTRUCTION BUFFER 230, the NEXTPC logic 250 is able to detect the end of the ICACHE line residing in INSTRUCTION BUFFER 230. However, the timing of the detection of the end of the ICACHE line is important to preventing stalls or bubbles in the instruction decode sequence from occurring. The NEXTPC logic 250 detects the end of ICACHE line condition and sets up the address of the next ICACHE line, PCU in FIG. 1, so that a fetch can occur during the next instruction cycle. FIG. 3 shows an example wherein $PC_{i+2}$ needs to be calculated during the decompression of $PC_{i+1}$ and, since $PC_{i+3}$ represents a new ICACHE line 224, the end of ICACHE line 222 must also be detected during the instruction cycle at time $t_3$.

Note that during the decompression of $PC_{i+1}$ at $t_3$, there is only one instruction, $INSTRUCTION_{i+2}$, remaining in INSTRUCTION BUFFER 230 and NEXTPC logic 250 scans for this condition. Also note that the end of ICACHE line determination is done two instructions before the fetch at time $t_4$ is to occur. For example, during $t_3$ when $PC_{i+1}$ is being decompressed, the NEXTPC logic 250 not only calculates $PC_{i+2}$ but determines that a fetch will occur two instructions later at $t_4$ and prepares $PC_{i+3}$ for the ICACHE fetch. Similarly, during $t_5$, the NEXTPC logic 250 calculates $PC_{i+5}$ and determines that a fetch will occur at $t_7$.

Instruction Sequencing Circuitry

Figure 4:
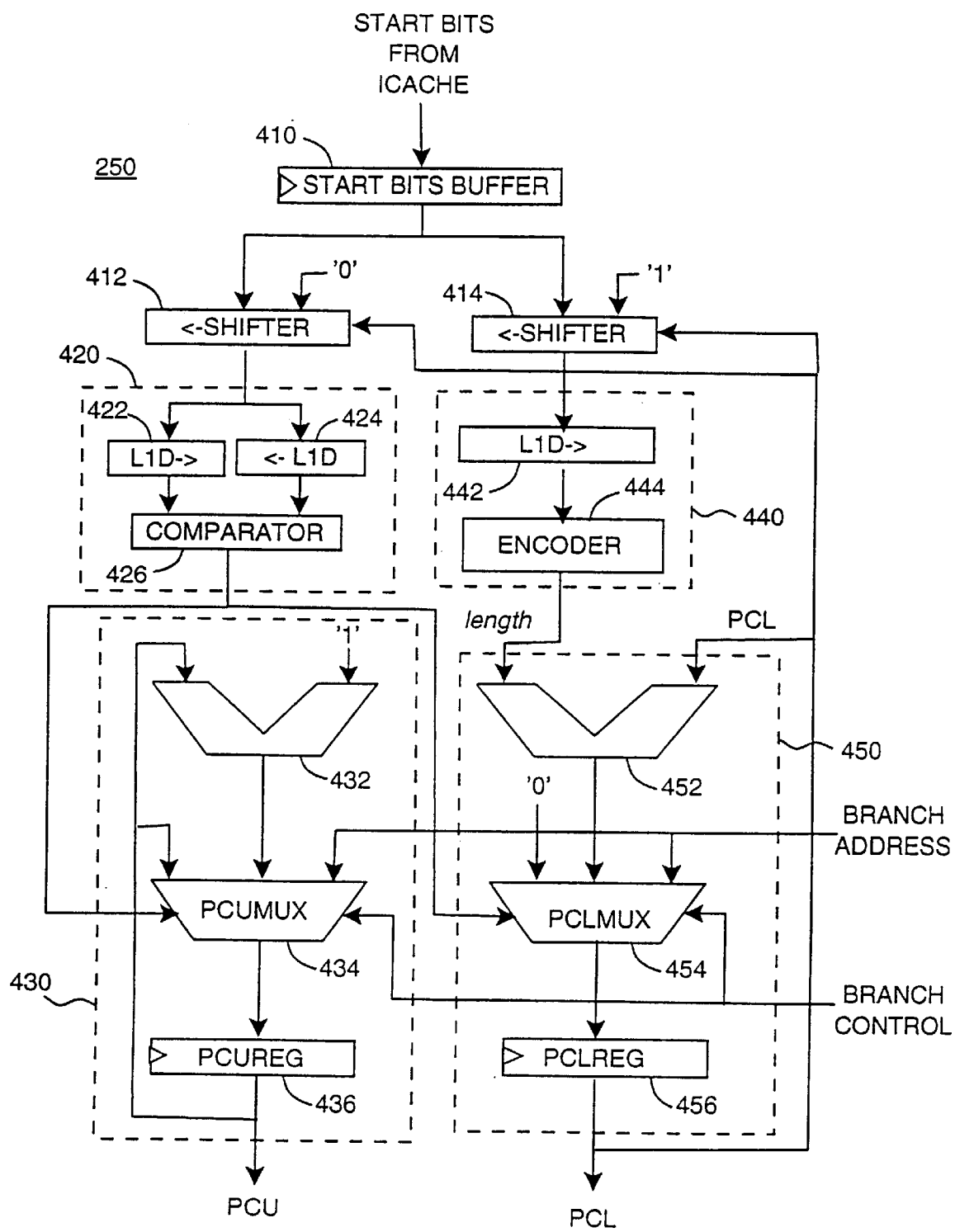
FIG. 4 is a functional block diagram of an embodiment of the decode circuitry of FIG. 1 according to the present invention.

FIG. 4 shows a functional block diagram of an embodiment of NEXTPC logic block 250 shown in FIG. 1. The embodiment of the NEXTPC logic 250 illustrated in FIG. 4 is divided into two parts: the upper program counter signal PCU that supplies the higher order portion of the program count address to decoder 210 in order to access the lines of ICACHE 220; and the lower program counter signal PCL which supplies the lower order portion of the program count address which controls the selection of individual instructions within an ICACHE line. FIG. 3 shows that during the I-stage of $PC_{i+3}$, the NEXTPC logic 250 generates two PC's; $PC_{i+2}$ for the DECOMPRESSION logic to act upon the current instruction and $PC_{i+3}$ for the ICACHE to fetch the next ICACHE line. In the example of FIG. 3, $PCU=PC_{i+3}$ is output to decoder 210 to fetch the next ICACHE line 224 from ICACHE 220 while $PCL=PC_{i+2}$ is output to INSTRUCTION BUFFER 230 and DECOMPRESSION logic 240 to expand $INSTRUCTION_{i+2}$ for output to registers 132, functional units 134 and control 140. Note that only the start bits from the ICACHE line are used in the NEXTPC logic 250 while the pos and word portions of the instructions in each ICACHE line are output to INSTRUCTION BUFFER 230 and the DECOMPRESSION logic 240.

The PCL signal selects the next instruction resident in the ICACHE line stored in INSTRUCTION BUFFER 230 for output to DECOMPRESSION logic 240 which expands the compressed instruction from ICACHE 220 into a full VLIW instruction. To obtain the PCL value, the start bits of the instruction loaded into INSTRUCTION BUFFER 230 are simultaneously loaded into START BITS BUFFER 410 in FIG. 4. Initially, the current instruction INSTRUCTION$_i$ is at the leftmost (most significant) position of INSTRUCTION BUFFER 230 and the start bit marking INSTRUCTION$_i$ is at the leftmost (most significant) position of the START BITS BUFFER 410. The start bits for the current ICACHE line are then loaded into shifters 412 and 414.

The shift amount of shifters 412 and 414 as well as INSTRUCTION BUFFER 230 is controlled by the PCL signal. The instruction boundary detector 440 includes a leading "1" detector (L1D) which looks for the next adjacent instruction in the ICACHE line by detecting the next start bit that is set to "1" (for the format illustrated in FIG. 2) as the start bits in shifter 414 are shifted left responsive to the PCL signal. The data in INSTRUCTION BUFFER 230 is simultaneously shifted left responsive to the PCL signal in order to left justify the next instruction in the ICACHE line so that it is in position for decompression during the next instruction cycle. Note that the most significant bit (MSB) of shifter 414 is ignored at the beginning of each I-stage as it is always the start bit of the current instruction. The output of L1D 442 represents the bit position of the start bit in the ICACHE line. The ENCODER 444 translates the bit position of the start bit output by L1D 442 into a binary value length which is output from instruction boundary detector 440 to instruction buffer control signal generator 450.

The binary value length$_i$ represents the length of the current instruction and is received by instruction buffer control signal generator 450, where length$_i$ is added to the current lower program count PCL$_i$ by adder 452 to derive the next lower program count PCL$_{i+1}$. Note that "1's" are inserted into the rightmost (least significant) position of shifter 414 to introduce a false start bit after the last instruction in the ICACHE line so that the length of the last instruction in the line can be determined. PCLMUX 454 multiplexes the PCL value generated by adder 452 to PCL register 456 during normal sequencing through the instructions of an ICACHE line. However, in the event of a branch in the instruction flow, such as when the next instruction is a branch, an interrupt occurs, or a new ICACHE line is fetched, the BRANCH CONTROL signal permits the new BRANCH ADDRESS value to be loaded into PCL register 456.

The value of the PCU signal is incremented by instruction cache line address signal generator 430 when the end of the ICACHE line in INSTRUCTION BUFFER 230 is reached and a new ICACHE line address is required in order to fetch another ICACHE line from ICACHE 220. As described above, the NEXTPC logic 250 detects when there is only one instruction left in the current ICACHE line after the instruction which is being decompressed. The end of ICACHE line condition is detected by instruction boundary marker detector 420 which uses L1Ds 422 and 424 to scan the start bits of the current ICACHE line from opposite directions, i.e. from the most significant to the least significant bit positions of shifter 412 and from the least significant to the most significant bit positions of shifter 412, in order to sense when there is only one start bit left in shifter 412. Shifter 412, contents of which are also leftshifted responsive to the PCL signal, inserts "0's" in the LSB position as each instruction in INSTRUCTION BUFFER 230 is leftshifted and decompressed. Comparator 426 compares the output of L1D 422 with that of L1D 424 for a match condition which indicates that L1Ds 422 and 424 have found the same start bit and hence there is only one instruction left in the current ICACHE line.

Since PCU is the row address of the ICACHE, the next ICACHE line address is obtained from PCU$_{i+1}$=PCU$_i$+1, which is obtained from adder 432 which adds one to the current value of PCU and outputs the result to PCUMUX 434. The output of comparator 426 controls PCUMUX 434 during normal sequencing so that the correct PCU value is stored in PCU register 436. When the end of ICACHE line condition has not yet been detected by comparator 426, then the output of the comparator controls PCUMUX 434 to feed the current upper program count value PCU$_i$ back into PCU register 436. When the end of ICACHE line is detected, then the output of comparator 426 switches states and controls PCUMUX 434 to select the next ICACHE line upper program count value PCU$_{i+1}$ for input into PCU register 436. The output of comparator 426 also directs PCLMUX 454 to load a "0" value into PCL register 456 for the new ICACHE line.

In the event of a program branch, the BRANCH CONTROL signal overrides the output of comparator 426 in order to load the upper portion of the BRANCH ADDRESS signal into PCU register 436 simultaneously to the loading of the lower portion of the BRANCH ADDRESS signal into PCL register 456. Program branches incur a delay in the instruction pipeline for the ICACHE line corresponding to the BRANCH ADDRESS value to be fetched from ICACHE 220 or for the cache decode circuitry 210 to detect an ICACHE miss and fetch further instructions from storage external to microprocessor 100. See commonly assigned U.S. Pat. No. 5,615,386 to Amerson et al for a COMPUTER ARCHITECTURE FOR REDUCING DELAYS DUE TO BRANCH INSTRUCTIONS for further details regarding branching. Once the ICACHE line corresponding to the branch address is loaded, however, rapid sequential execution of instructions can be resumed by use of the present invention.

Figure 5:
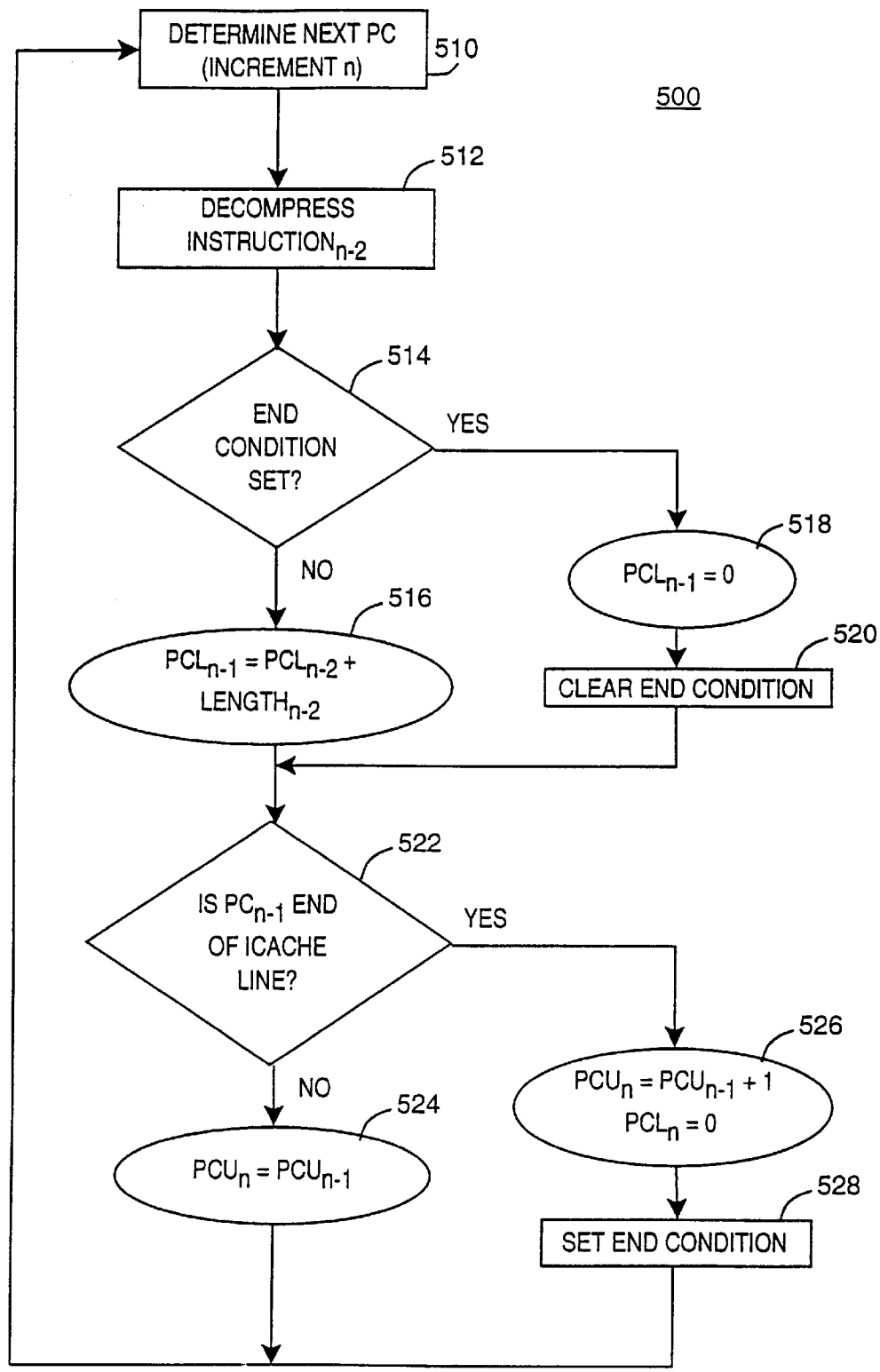
FIG. 5 is a flowchart diagram of an embodiment of the NEXTPC instruction decode algorithm occurring at each instruction cycle shown in FIG. 3.

FIG. 5 is a flow chart of an example of the algorithm 500 which takes place during each of the I-stages shown in FIG. 3 once the instruction pipeline illustrated in FIG. 4 is full. Each I-stage enters the flow chart at step 510 for consideration of a new program count PC$_n$. Once the instruction pipeline is full, each instruction cycle will include the decompression of INSTRUCTION$_{n-2}$, shown as the X-stages in FIG. 3 and shown at step 512 of FIG. 5. Each I-stage will also determine the value of PCL$_{n-1}$, which is output as PCL to INSTRUCTION BUFFER 230 and DECOMPRESSION logic 240 to accomplish the decompression of step 512 during the next instruction cycle.

The value of PC$_{n-1}$ depends on whether the end of ICACHE line condition was encountered in the I-stage of the previous instruction cycle. Therefore, the end condition is checked at decision block 514. If the end condition was not set, then INSTRUCTION$_{n-1}$ was not the first instruction in an ICACHE line and PCL$_{n-1}$ is PCL$_{n-2}$ plus length$_{n-2}$, as illustrated in step 516, where length$_{n-2}$ was obtained from the decompression stage of step 512. If the end condition is set, then INSTRUCTION$_{n-1}$ was the first instruction of an ICACHE line and PCL$_{n-1}$ is set to 0 in step 518 and the end condition is cleared in step 520.

Each I-stage makes a determination of whether INSTRUCTION$_{n-1}$ is the last instruction in an ICACHE line, as represented by decision block 522. If INSTRUCTION$_{n-1}$ is the last instruction in the current ICACHE line, then the upper program count PCU is incremented, represented by PCU$_n$=PCU$_{n-1}$+1 in step 526, which results in the fetch of a new ICACHE line in the next instruction cycle. The end condition is also set so that the PCL value can be correctly set in the next instruction cycle. If an end of ICACHE line condition is not encountered, then the value of PCU remains the same for the next instruction cycle.

It should be noted that, despite the sequential nature of the flow diagram 500 in FIG. 5, the decompression (X), fetch (F) and instruction decode (I) stages occur in parallel, as illustrated in FIG. 3. This results in an instruction being decoded in each instruction cycle once the instruction pipeline is full, as can be observed in the time span from t2 to t7 in FIG. 3, despite the fetch cycles that are required when instruction sequencing crosses ICACHE line boundaries and despite the variable length nature of the compressed instructions.

In summary, the present method and apparatus for sequencing instructions does not require decoding to be included in the fetch stage, thereby avoiding delays in instruction pipeline to execute fetches of new ICACHE lines. The present invention also avoids increasing the size of the instruction cache or the addition of another memory array to store the length information needed to sequence through variable length instructions. The present method and apparatus calculate the instruction lengths and fetch new ICACHE lines at the same time as instructions are decompressed by looking ahead at the start bits for the instructions in the ICACHE line currently residing in the INSTRUCTION BUFFER.

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. An instruction decoding circuit for decoding variable length instructions having instruction boundary markers, the instruction decoding circuit comprising:

an instruction sequencing circuit configured to generate an instruction cache line address signal which selects a line of variable length instructions from an instruction cache and which is further configured to detect an end of instruction cache line condition and, responsive thereto, select another line of variable length instructions, and still further wherein the instruction sequencing circuit is configured to receive the instruction boundary markers corresponding to the line of variable length instructions, detect a boundary of each variable length instruction in the line of variable length instructions and, responsive thereto, generate an instruction buffer control signal;

an instruction buffer configured to receive and store the line of variable length instructions from the instruction cache, wherein the instruction buffer is further configured to receive the instruction buffer control signal and, responsive thereto, shift the line of variable length instructions to a most significant position of the instruction buffer responsive to the instruction boundary markers such that each variable length instruction in the line of variable length instructions is selected for output from the instruction buffer by the instruction buffer control signal.

2. The instruction decode circuit of claim 1, wherein the instruction sequencing circuit further includes:

a first shifter configured to receive the instruction boundary markers corresponding to the line of variable length instructions, wherein the first shifter leftshifts the instruction boundary markers responsive to the instruction buffer control signal and the first shifter is further configured to fill from the right with a false instruction boundary marker;

a first instruction boundary marker detector configured to detect the instruction boundary marker of a subsequent variable length instruction adjacent to a current variable length instruction in the line of variable length instructions and output a signal indicating the position of the instruction boundary marker of the subsequent variable length instruction;

an encoder configured to encode the signal indicating the position of the instruction boundary marker of the subsequent variable length instruction in order to produce a length value indicating the length of the current variable length instruction; and an instruction buffer control signal generator circuit configured to receive the length value and generate the instruction buffer control signal responsive thereto.

3. The instruction decode circuit of claim 2, wherein the instruction sequencing circuit further includes:

a second shifter configured to receive the instruction boundary markers corresponding to the line of variable length instructions, wherein the second shifter leftshifts the instruction boundary markers responsive to the instruction buffer control signal and the second shifter is further configured to fill from the right with a value corresponding to an absence of an instruction boundary marker;

a second instruction boundary marker detector configured to detect when a single instruction boundary marker remains in the second shifter and, responsive thereto, generate the end of instruction cache line signal; and an instruction cache line address signal generator configured to receive the end of instruction cache line signal and, responsive thereto, increment a value of the instruction cache line address signal and to output the instruction cache line address signal to the instruction cache.

4. The instruction decode circuit of claim 3, wherein the instruction buffer control signal generator circuit further includes:

a first adder configured to receive the length value and the instruction buffer control signal and add the length value to the value of the instruction buffer control signal in order to produce an output signal;

a first program count register configured to store and output the instruction buffer control signal; and a first multiplexor interposed the first adder and the first program count register and configured to select one of a branch address signal, a '0' value and the output signal of the first adder for input to the first program count register, wherein the first multiplexor is further configured to receive a branch control signal which controls selection of the branch address over the '0' value and the output signal of the first adder, and wherein the first multiplexor is still further configured to receive the end of instruction cache line signal and, responsive thereto, select the '0' value over the output signal from the first adder.

5. The instruction decode circuit of claim 4, wherein the instruction cache line address signal generator circuit further includes:
   a second adder configured to increment the value of the instruction cache line address signal in order to generate an incremented line address signal value;
   a second program count register configured to store and output the instruction cache line address signal to the instruction cache; and
   a second multiplexor interposed the second adder and the second program count register and configured to select one of a branch address signal, a present value of the instruction cache line address signal and the incremented line address signal value for output to the second program count register, wherein the second multiplexor is further configured to receive a branch control signal which controls selection of the branch address over the present value of the instruction cache line address signal and the incremented line address signal, and wherein the second multiplexor is still further configured to receive the end of instruction cache line signal and, responsive thereto, select the incremented line address signal value over the present value of the instruction cache line address signal.

6. The instruction decode circuit of claim 2, wherein the instruction boundary marker is a logical one value and the first instruction boundary marker detector further includes a first leading one detector configured to detect the position of a leading one corresponding to the instruction boundary marker of the subsequent instruction in the instruction buffer.

7. The instruction decode circuit of claim 3, wherein the instruction boundary marker is a logical one value and the second instruction boundary marker detector further includes:
   a second leading one detector configured to detect a position of a leftmost instruction boundary marker in the second shifter;
   a third leading one detector configured to detect a position of a rightmost instruction boundary marker in the second shifter; and
   a comparator configured to generate the end of instruction cache line signal when the position of the leftmost instruction boundary marker nearest output from the second leading one detector matches the position of the rightmost instruction boundary marker output from the third leading one detector.

8. A method for sequencing variable length instructions in a processor, the method including the steps:
   marking a boundary between variable length instructions with an instruction boundary marker in each instruction;
   loading a line of variable length instructions from an instruction cache into an instruction buffer;
   detecting a position of an instruction boundary marker corresponding to an adjacent instruction in the line of variable length instructions in the instruction buffer;
   encoding the position of the instruction boundary marker of the adjacent instruction into a length value; and
   shifting the line of variable length instructions in the instruction buffer by the length value.

9. The method of claim 8, wherein the step of shifting the line of variable length instructions in the instruction buffer by the length value includes the steps:
   adding the length value to a current lower program count value, corresponding to an offset position of a current variable length instruction in the line of variable length instructions, to produce a next lower program count value;
   loading the next lower program count value into a lower program count register; and
   outputting the next lower program count value to the instruction buffer; and
   shifting the line of variable length instructions in the instruction buffer to an offset position corresponding to the adjacent variable length instruction.

10. The method of claim 8, including the step of dispatching the current variable length instruction in the line of variable length instructions in the instruction buffer.

11. The method of claim 9, including the steps:
   detecting when there is one unexecuted instruction remaining in the line of variable length instructions in the instruction buffer; and
   fetching another line of variable length instructions from the instruction cache into the instruction buffer in response to detecting that there is one instruction remaining in the line of variable length instructions in the instruction buffer.

12. The method of claim 11 wherein the step of fetching another line of variable length instructions from the instruction cache into the instruction buffer includes the steps:
   incrementing an upper program count value in response to detecting when there is one instruction remaining in the line of variable length instructions in the instruction buffer to produce a next upper program count value;
   loading the next program count value into an upper program count register; and
   outputting the next program count value to the instruction cache.

13. The method of claim 12 including the step of selecting a '0' value over the next lower program count value for loading into the lower program count register responsive to detecting when there is one instruction remaining in the line of variable length instruction in the instruction buffer.

14. The method of claim 13 including the steps of:
   selecting a branch address value over the '0' value and the next lower program count value for loading into the lower program count register responsive to a branch control signal; and
   selecting the branch address value over the next upper program count value for loading into the upper program count register responsive to the branch control signal.

15. A variable length instruction decode circuit for decoding variable length instructions, the circuit comprising:
   an instruction buffer configured to receive a line of variable length instructions from an instruction cache and shift the line of variable length instructions toward a most significant word position of the instruction buffer responsive to an instruction buffer control signal by a number of word positions specified by a value of the instruction buffer control signal;
   a first shift register configured to receive a set of boundary marker bits corresponding to the line of variable length instructions in the instruction buffer and shift the set of boundary marker bits toward the most significant bit position of the first shift register responsive to the instruction buffer control signal by a number of bit positions specified by the value of the instruction buffer control signal, and wherein the first shift register has a shift input which is configured to fill a least significant position of the first shift register with a boundary marker bit value corresponding to an instruction boundary marker responsive to each shift;

a first instruction boundary marker detector configured to receive the boundary marker bits contained within the first shift register and output a length value corresponding to a number of bit positions between the most significant bit position of the first shift register and a next most significant boundary marker bit in the set of boundary marker bits which indicates an instruction boundary marker; and an instruction buffer control signal generator configured to receive the length value output by the first instruction boundary marker detector and output the instruction buffer control signal wherein the value of the instruction buffer control signal is determined by adding the length value to a current value of the instruction buffer control signal in order to produce a next value of the instruction buffer control signal.

16. The circuit of claim 15, further including:

a second shift register configured to receive the set of boundary marker bits corresponding to the line of variable length instructions in the instruction buffer and shift the set of boundary marker bits responsive to the instruction buffer control signal toward a most significant bit position of the second shift register by the number of bit positions specified by the value of the instruction buffer control signal, and wherein the second shift register has a shift input which is configured to fill a least significant position of the second shift register with a boundary marker bit value indicating the absence of an instruction boundary marker responsive to each shift;

a second instruction boundary marker detector configured to receive the boundary marker bits contained within the second shift register and output an end of instruction line signal when a single instruction boundary marker remains in the second shift register; and an instruction cache line address signal generator configured to output an instruction cache line address signal wherein the instruction cache line address signal generator increments a value of the instruction cache line address signal responsive to the end of instruction line signal; and wherein the instruction buffer control signal generator is further configured to set a next value of the instruction buffer control signal to a value corresponding to the most significant position of the instruction buffer and the first shift register responsive to the end of instruction line signal.

17. The circuit of claim 16, wherein:

the instruction buffer control signal generator is further configured to receive a branch address signal and a branch control signal and set the instruction buffer control signal to a value determined by the branch address responsive to the branch control signal; and the instruction cache line address signal generator is further configured to receive the branch address signal and the branch control signal and set the instruction cache line address signal to a value determined by the branch address responsive to the branch control signal.

18. The circuit of claim 17, wherein:

the instruction buffer control signal generator further includes:

a first adder configured to receive the length value and the instruction buffer control signal, add the length value to the current value of the instruction buffer control signal and generate the new value of the instruction buffer control signal, a first multiplexor configured to receive the new value of the instruction buffer control signal output by the first adder, the value corresponding to the most significant position of the instruction buffer and the first shift register, the end of instruction line signal, the branch address, and the branch control signal, wherein the first multiplexor is further configured to select the value corresponding to the most significant position of the instruction buffer and the first shift register for output responsive to the end of instruction line signal, and wherein the first multiplexor is still further configured to select the branch address for output over the new value of the instruction buffer control signal output by the first adder and the value corresponding to the most significant position of the instruction buffer and the first shift register responsive to the branch control signal, and wherein the first multiplexor is yet still further configured to select the new value of the instruction buffer control signal output by the first adder for output in the absence of the end of instruction line signal and the branch control signal, and a lower program count register configured to receive and store the output of the first multiplexor for output as the instruction buffer control signal; and wherein the instruction cache line address signal generator further includes:

a second adder configured to increment the current value of the instruction cache line address signal and generate a new value of the instruction cache line address signal, a second multiplexor configured to receive the new value of the instruction cache line address signal output by the second adder, the current value of the instruction cache line address signal, the end of instruction line signal, the branch address, and the branch control signal, wherein the second multiplexor is further configured to select the new value of the instruction cache line address signal output by the second adder for output responsive to the end of instruction line signal, and wherein the second multiplexor is still further configured to select the branch address for output over the new value of the instruction cache line address signal output by the second adder and the current value of the instruction cache line address signal responsive to the branch control signal, and wherein the second multiplexor is yet still further configured to select the current value of the instruction cache line address signal for output in the absence of the end of instruction line signal and the branch control signal, and an upper program count register configured to receive and store the output of the second multiplexor for output as the instruction cache line address signal.

19. The circuit of claim 15, wherein the instruction boundary marker bits are further comprised of start bits.

20. The circuit of claim 15, wherein the instruction boundary marker bits are further comprised of stop bits.

* * * * *